(12) United States Patent
Seeman

(10) Patent No.: US 8,069,078 B2
(45) Date of Patent: Nov. 29, 2011

(54) METHOD OF OBTAINING A REPRESENTATIVE ONLINE POLLING SAMPLE

(76) Inventor: Neil Laurence Seeman, Toronto (CA)

( * ) Notice: Subject to any disclaimer, the term of this patent is extended or adjusted under 35 U.S.C. 154(b) by 1228 days.

(21) Appl. No.: 11/676,540

(22) Filed: Feb. 20, 2007

(65) Prior Publication Data

US 2008/0201200 A1    Aug. 21, 2008

(51) Int. Cl.
*G06F 17/60* (2006.01)
(52) U.S. Cl. ........................................................ 705/7.32
(58) Field of Classification Search ................... 705/7.32
See application file for complete search history.

(56) References Cited

U.S. PATENT DOCUMENTS

| | | | | |
|---|---|---|---|---|
| 5,893,098 | A * | 4/1999 | Peters et al. | 1/1 |
| 6,760,746 | B1 * | 7/2004 | Schneider | 709/203 |
| 6,792,458 | B1 * | 9/2004 | Muret et al. | 709/224 |
| 7,418,496 | B2 * | 8/2008 | Macey et al. | 709/224 |
| 2003/0200137 | A1 * | 10/2003 | Drummond | 705/12 |
| 2004/0143481 | A1 * | 7/2004 | Li | 705/10 |

OTHER PUBLICATIONS

Tegarden "Business Information Visualization", Jan. 1999, Communcations of the Associations for Information Systems, pp. 1-38.*
Johnson (Electric and Public Polling: Will the Media Get Online Polling Right).*
Smith (Casting the Net: Surveying an Internet Population), Naval Postgraduate School, pp. 1-22.*
Marti et al (A dynamic Service Discovery Architrecture), Sep. 2002, Mobile and Media Systems Laboratory, pp. 1-19.*
Johnson (Electric and Public Polling: Will the Media Get Online Polling Right), Dec. 2002, Psychology & Marketing, pp. 1-15.*
Smith (Casting the Net: Surveying an Internet Population), Jun. 1997, Naval Postgraduate School, pp. 1-22.*

* cited by examiner

*Primary Examiner* — Romain Jeanty
(74) *Attorney, Agent, or Firm* — Saul Ewing LLP

(57) ABSTRACT

A method of obtaining a representative online polling sample is disclosed. The first step is to provide a polling web site with polling information for a user to select or otherwise interact with. However, that polling web site has a domain name that differs from the domain name of a web site the user intends to reach, the polling web site being reached when the user makes a typing or other address input error and inadvertently enters the polling web site domain name. Hence, for example, Google could harvest the many thousands of users who inadvertently type in gogle.com instead of google.com and direct them to an online polling page, instead of simply redirecting them to the google.com web site. This approach substantially eliminates coverage bias from the sample.

21 Claims, 2 Drawing Sheets

Web sites 4

Polling web site 5      DNS 6      Web browsers 7

Web sites 1     DNS 2     Web browsers 3

Web sites 4

Polling web site 5     DNS 6     Web browsers 7

METHOD OF OBTAINING A REPRESENTATIVE ONLINE POLLING SAMPLE

BACKGROUND OF THE INVENTION

1. Field of the Invention

This invention relates to a method of obtaining a representative online polling sample.

2. Description of the Prior Art

In order to identify a representative random sample of the larger population in any public opinion poll, whether conducted online, by print survey or by telephone, it is necessary to eliminate as much as possible the "coverage bias" of those targeted for polling. Coverage bias is eliminated when every potential respondent in the entire population has an equal probability of being surveyed. Unless the entire population (e.g. for a national population) is approached to complete the survey or poll, it is generally considered impossible to target a group of respondents from a given population, all of whom have an equal probability of being presented with the option of completing the survey. In the context of telephone surveying, for example, substantial coverage bias creeps into any such survey since people with cellular phones are more inaccessible to the surveyor than are other potential respondents; people who work outside the home are less accessible than are other potential respondents who stay at home during the work day; furthermore, the rising number of individuals who block out telemarketing companies from reaching them by telephone are also excluded as potential respondents.

The end goal for any surveyor is to obtain a representative random sample of the population of interest (e.g. Canadians, Britons, Australians) in the final group of respondents. Given the presence of coverage bias and a number of other biases that creep into any survey that might make the non-respondent pool statistically different than the respondent pool—notably, the fact that some individuals sharing certain characteristics (gender, age, income, or psychological profile) may be more willing to answer a certain type of survey than will others—a survey that seeks to be scientific can engage in a number of approaches to reduce, but never eliminate altogether, such biases. The first and most critical method is to increase the sample size of those polled; this in turn reduces the "margin of error" of the final result, or the chance that the result observed is due to random chance rather than due to the actual data observed. Another approach is a type of multi-stage sampling or cluster sampling, where the surveyor assumes a number of variables a priori that can potentially affect the outcome, such as geographic area; the surveyor then proceeds to survey a representative number of people from one geographic area, or cluster, before moving to the next cluster or block (e.g. area code, in the case of telephone surveys). The final method is stratification: after the data have been collected, the surveyor corrects for a number of variables that could potentially skew the final results. In the stratification approach or in the cluster sampling approach, the possible criteria for which the surveyor will correct are inherently subjective; the most commonly used criteria in political polling are socioeconomic income, age, and gender. It is impossible for the surveyor to know all the possible variables that are exogenous to the question posed and which therefore require adjusting to the survey results.

The difference between cluster sampling and stratified sampling is that in cluster sampling the cluster is treated as the sampling unit so analysis is done on a population of clusters. In stratified sampling, the analysis is done on elements within strata. In stratified sampling, a random sample is drawn from each of the strata, whereas in cluster sampling only the selected clusters are studied. The main objective of cluster sampling is to reduce costs by increasing sampling efficiency; with stratified sampling, the main objective is to increase precision.

Given the many substantial challenges of obtaining a representative random sample, all forms of polling—notably online polling—have been criticized by methodologists. Online polling is especially prone to bias since there is very little randomization, if any, in the process of identifying potential survey respondents. Online respondents who, for example, take a political survey on a media website are, by definition, overly representative of people interested in that particular news media site. Accordingly, it would require the recruitment of a very large group of potential respondents online in order to assume that the respondent pool was sufficiently representative. The goal of obtaining a representative sample is therefore exceptionally challenging online. The challenge would be overcome if one could create a system where the universe of potential respondents surveyed each has an equal probability of taking the survey. Inevitably, there would still be some bias in those who actually respond to the survey if these probabilities were to be equalized—since some individuals have more time to answer a survey or may be more inclined to respond to the particular survey for whatever reason. However, if one could equalize the probability of every Internet user taking a particular survey, one would substantially increase the likelihood of obtaining a representative global sample prior to adjusting, ex post, for any additional biases or non-random effects. The number of people needing to be surveyed in order to achieve a representative random sample would drop dramatically, as would the number and complexity of the possible stratifications, or risk adjustments (e.g. for age, gender, psychological profile, etc.) to be done after the survey data have been collected. Such an invention would dramatically reduce the time and labor that companies, governments, nonprofit corporations, researchers or others would need to invest in order to conduct a scientifically valid survey online and to thereby obtain a representative random sample.

SUMMARY OF THE INVENTION

In a first aspect, the invention is a method of obtaining a representative online polling sample, comprising the step of providing a polling web site with polling information for a user to select or otherwise interact with, that polling web site having a domain name that differs from the domain name of a web site the user intends to reach, the polling web site being reached when the user makes a typing or other address input error and inadvertently enters the polling web site domain name.

In one implementation, the typing or address input error relates to the TLD of the web site the user intended to reach. For example, the typing or address error may relate to inputting a ccTLD instead of a gTLD. The ccTLD could be selected from the group: .cm, .co., .om. So the typing or address error could relate to inputting one of .cm, .co., or .om, instead of .com. Hence, for example, Google could harvest the many thousands of users who inadvertently type in google.cm instead of google.com and direct them to an online polling page, instead of simply re-directing them to the google.com web site. This approach substantially eliminates coverage bias from the sample.

In one implementation, all unused domain names within the .cm, co or .om ccTLDs automatically redirect the user to the polling web site because a wildcard redirect has been used in the DNS for that ccTLD.

The typing or address input error relates to the body of the domain name, i.e. a part of the domain name excluding the TLD. Hence, for example, Google could use the many thousands of users who inadvertently type in gogle.com instead of google.com and direct them to an online polling page, instead of simply re-directing them to the google.com web site. This approach substantially eliminates coverage bias from the sample.

The method may comprise the further step of recruiting a polling panel member. Those panel members who are recruited may serve as future respondents to real-time polls or as targeted respondents for future polling. Further, the method may be used for conducting real-time instant polls of a respondent population that is devoid of coverage bias.

It is possible also to segregate members of the representative sample by country location by using the IP address of each user in the sample. This can be a very useful tool when analyzing polling results.

The polling web site itself can provide to the user instant feedback of current polling results, segregated by country location.

Other uses for the method are to predict political or economic events based on the results of polling the respondent pool. It is possible also to use the method to assess and track website popularity over time.

The polling site may not be reached directly when the user inputs (inadvertently) the polling web site domain name. The user may instead be first taken to a conventional landing page with sponsored links, or a page with some other kind of content (e.g. news). There may simply be an advertisement or other link on this page; this link could also itself be a polling question, or could be activated when a user answers a polling question on the landing page. A user who clicks the link (e.g. answers a polling question) is then redirected to a full polling page.

A second aspect is a web site hosted on a server, the web site enabling a representative online polling sample to be obtained, the web site including polling information for a user to select or otherwise interact with, that polling web site having a domain name that differs from the domain name of a web site the user intends to reach, the polling web site being reached when the user makes a typing or other address input error and inadvertently enters the polling web site domain name.

BRIEF DESCRIPTION OF THE DRAWINGS

The invention will be described with reference to the accompanying figures, in which.

DETAILED DESCRIPTION

Figure 1:
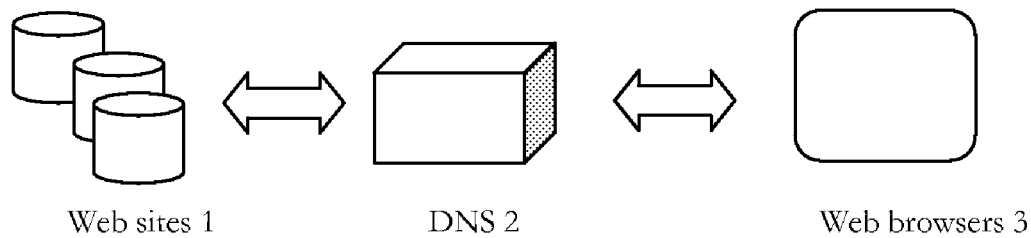
FIG. 1 shows schematically a typical prior art system for browsing web pages.

This solution reduces the coverage bias that exists in all existing online survey techniques. Existing online polls are generally not considered scientific due to the way in which respondents are targeted and recruited. Respondents typically sign up on the pollster's site. Under the invention, every individual Internet user around the globe has the equal probability of being drawn into the potential respondent pool. This dramatically reduces selection bias and coverage bias as compared to all other current techniques of respondent identification and selection online. There is no reason to believe that the people who fail to randomly fall into the potential survey population (i.e., who do not make the typographical error) have distinct characteristics from the people who do, thus increasing the validity of the results. This makes the process of respondent selection scientifically valid, superior even to random digit telephone dialing. The process makes it easier to obtain a representative panel and to have confidence in the precision of the survey results. In comparison, advertising on any particular website will draw panel members who are predisposed to viewing that website.

The possible use cases of the invention are several.

First, it offers the power to recruit polling panel members (for future polling or real-time polling) in a globally randomised fashion. The speed of obtaining a panel that is representative will be accelerated considerably over all current methods of respondent recruitment, since these current methods require that the potential respondent sign up on the pollster's website—a phenomenon which necessarily introduces selection bias into the respondent sample.

Secondly, up-to-the-minute, real-time instant polling permits a randomized target sample of respondents to immediately answer questions on the spot, and then, if they so choose, to become panel members. Samples can be either global or national (by segregating out individuals linking to the site from different country domains). Immediate polling for global or national populations is necessary to get immediate representative reaction to public events/perceptions such as advertising campaigns (e.g. how a particular brand is faring), political events (e.g. predicting movement in public opinion in the last 2 days of an election is very difficult otherwise), the efficacy of crisis management (e.g. how well the government is responding to a pandemic or bioterrorist attack) and news events. As with current website-based online polling, such as occurs on newspaper websites, the user may get instant feedback as to the poll's results and may also be encouraged to bookmark and come back later to the site to receive updated results over time. This will encourage people to take the surveys repeatedly.

Third, the invention offers the power of prediction for potentially destabilizing political and economic events of a global or national nature. In the financial markets, certain destabilizing events—notably a residential real estate crash—can be predicted by what economists have called "talk," or the opinion of the masses. In the context of predicting the location of potential terrorist activity, for example, the invention could track trends in randomized public opinion over time. Statistical spikes in public concern over a potential terrorist event among, for example, Israeli respondents (identified through the geographic location of the user's IP address) could offer additional intelligence into the mood of the public. Even very small spikes, if statistically deviant from normal patterns, could be worthy of investigation depending on the question posed: e.g. "Do you have reason to believe that there will be terrorist activity in the United States in the next 24-36 hours?"

A fourth application is to assess website popularity. Currently this is achieved via web browser plug-ins (i.e. Alexa-.com). These, however, are biased towards sites that certain individuals (e.g. who would install the Alexa plug-in) use. This invention allows real-time statistics of usage of websites around the world, for example using a sampling methodology such as proportion of mis-hits to a given site out of the total sample of mis-hits. The application eliminates "coverage bias"—the error resulting from samples that are not representative of the total user population. (It must be recognized that a limitation of this application is that it only measures initial URL type-ins. It does not recognise the popularity of sites that are linked (i.e. not typed in) to, i.e. linked from an Internet search engine or from another website. It also cannot give any sense of the time people spend on a site once they are there.)

The invention demonstrates that this is the Internet's solution to more easily obtaining large, representative samples of respondents. Potential registrants do not display any coverage bias since they do not deliberately come to the site in question; they stumble upon it by accident.

The uniqueness lies in the fact that there is the equal statistical probability of any Internet user landing on the site considering the opinion poll. The process by which this happens is through the proprietary technology. The application of the invention cures the problem of coverage bias and helps reduce selection bias. The equality of the probability of being drawn into the survey pool for every user is what makes this distinctive. Also, respondent bias is reduced because the individual respondent is not someone predisposed to answering surveys or reading media sites, etc. The probabilities are more equal than the phone solution to polling, since that does not capture people with just have cell phones, or people who block out telemarketers/pollsters (which individuals can do in some jurisdictions but not all). The second unique feature is its global nature—theoretically, a site like Google or Yahoo or a major news site could compete on this level. However, again, the uniqueness lies in the probabilities—there is the same probability that U.S. Internet users will land on the site and become respondents/panel registrants as for Chileans who use the net; no other existing application can provide this. There is the same probability a man will make this typographical error as a woman, etc. The only bias is people prone to making typos and who speak English (if the survey question is in English).

Figure 2:
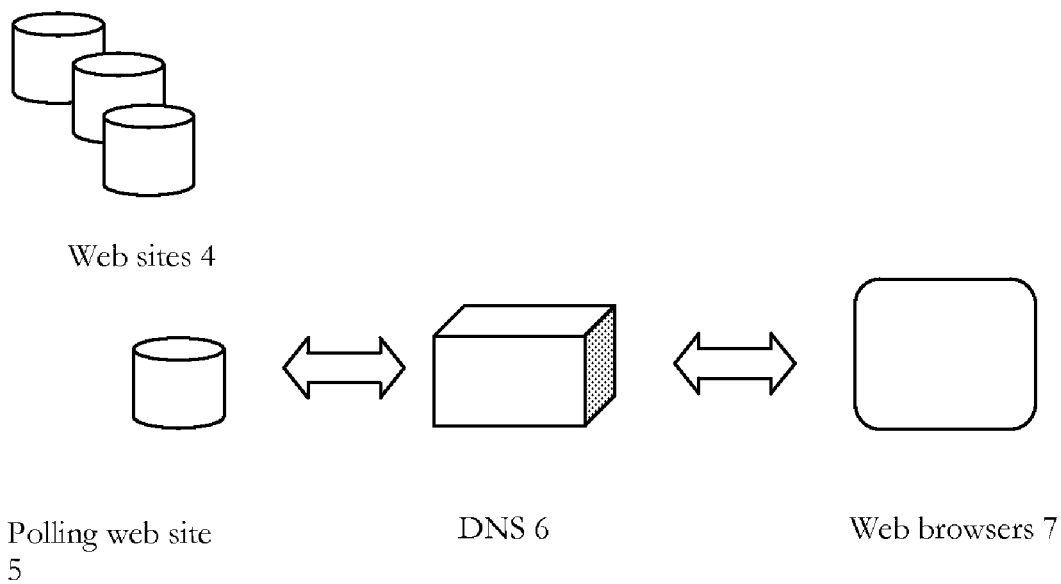
FIGS. 2 and 3 show schematically systems that implement the present invention.
Figure 3:
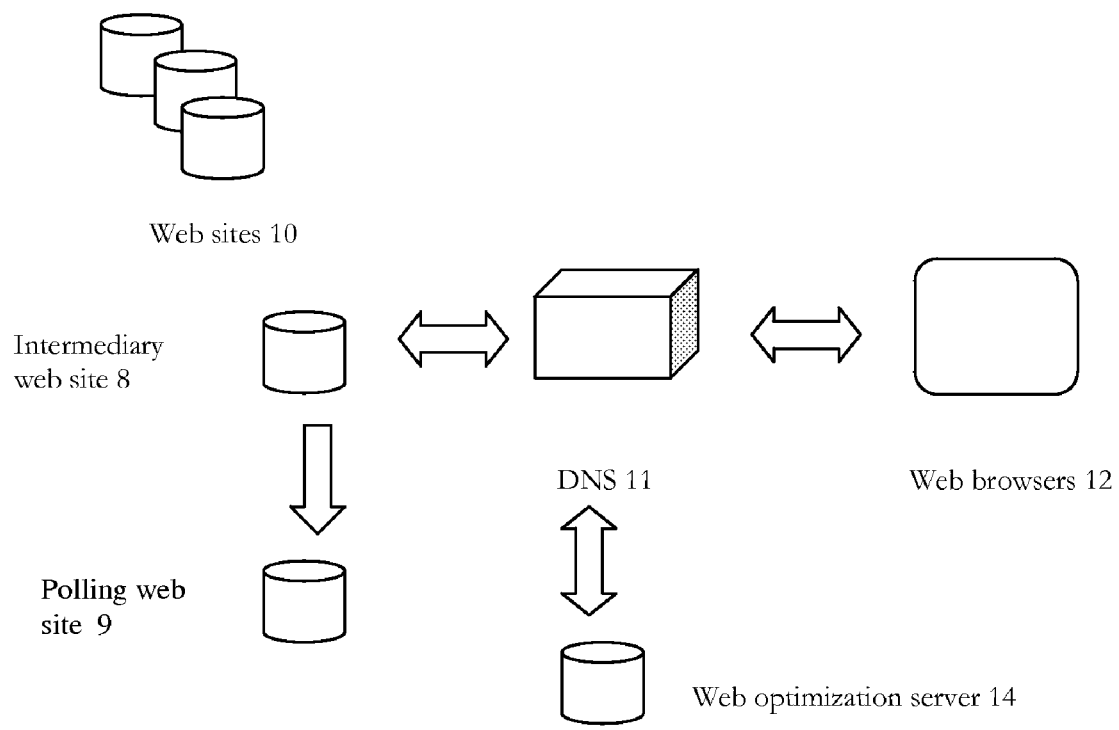

The operation of the present invention is illustrated schematically in the Figures. FIG. 1 shows the conventional Prior Art arrangement, in which web sites 1 are each labeled with a unique domain name, such as microsoft.com, google.com, ibm.com etc. Users enter the required domain name into their web browser 3 and the DNS domain name servers 2 route the request to the appropriate web site, which then returns to the requesting web browser 3 data needed to reconstruct a web page. With an implementation of the present invention, shown in FIG. 2, a polling web site 5 is provided; it has a domain name that is similar to the domain name of a web site 4 that the user intends to reach; the user inadvertently reaches the polling web site when he incorrectly types in the domain name into the web browser 7 URL line of the web site he intends to reach. Instead, he types in the domain name associated with the polling web site 5. For example, he might want to reach google.com; but he types in www.google.co; Google Inc. has however registered that domain name google.co (with the Colombian domain name registrar) and that domain name resolves via DNS 6 to a polling web site 5 and not a conventional search engine web site 4. FIG. 3 shows a variant of the FIG. 2 system, in which an intermediary web site 8 has a domain name similar to that of a conventional web site 10; when the user inadvertently enters the intermediary web site domain name into the URL address bar of his web browser 12, the DNS 11 resolves the query to intermediary web site 8—this can be a landing page web site, or a news web site, or some other kind of web site with content that the user may find interesting; the objective is for the user not to immediately try to enter the correct domain name when he realizes he has not reached the intended domain name. The intermediary web site 8 might include a hyperlink to the full polling web site 9 as explained above. The full polling web site is similar to the many online polling web sites that are already available, such as www.canada2020.com. It may hence have general polling questions (i.e. questions for whom a random sample of respondents is needed) or questions specific to the audience for the intended web site 10. Where relevant and optimized polling questions are to be presented, then there could be a server 14 that analyses the traffic sent from DNS 11 to pick out relevant words: for example, if someone types in cars.cm, hoping to reach a web site called cars.com, then the server could present to the user an intermediary web page with car related stories and links, plus a car related polling question, such as "Should car manufacturers provide more environmentally friendly vehicle?". If the user answers the polling question, then they could be taken to a more detailed car related set of questions on polling web site 9. Likewise, if the user enters google.cm, then the optimization server 14 might present the user with a dedicated page 8 from Google, Inc. with information related to different services from Google, plus search related polling questions (e.g. "Do you find paid-for advertisements useful?"). If the user answers the polling question, he is then taken to a more detailed set of polling questions on polling web site 9.

In another implementation, some (or possibly all) unused domain names within one or more of the .cm, .co or .om ccTLDs automatically redirect the user to the intermediary web site (if a FIG. 3 type scheme is used) or directly to a polling web site (if a FIG. 2 type scheme is used) because a wildcard redirect has been used in the DNS (9 or 11) for that ccTLD.

GLOSSARY

TLD—top-level domain
ccTLD—country-code top-level domain
gTLD—generic top-level domain
DNS—Domain Name Server(s)
URL—Uniform Resource Locator

The invention claimed is:

1. Method of obtaining a representative online polling sample using a server and a computer in connection with the server, comprising the step of providing on the server a polling web site with polling information for a user to select or otherwise interact with using the computer, that polling web site having a domain name that differs from the domain name of a web site the user intends to reach, the polling web site being reached when the user makes a typing or other address input error using the computer and inadvertently enters the polling web site domain name.

2. The method of claim 1 in which the typing or address input error relates to the TLD of the web site the user intended to reach.

3. The method of claim 2 in which the typing or address error relates to inputting a ccTLD instead of a gTLD.

4. The method of claim 3 in which the ccTLD is selected from the group: .cm, .co., .om.

5. The method of claim 4 in which the typing or address error relates to inputting one of .cm, .co., or .om, instead of .com.

6. The method of claim 5 in which a portion of unused domain names within the .cm, .co or .om ccTLDs automatically redirect the user to the polling web site because a wildcard redirect has been used in the DNS for that ccTLD.

7. The method of claim 5 in which all unused domain names within the .cm, .co or .om ccTLDs automatically redirect the user to the polling web site because a wildcard redirect has been used in the DNS for that ccTLD.

8. The method of claim 1 in which the polling web site is not reached directly when the user inputs inadvertently the polling web site domain name.

9. The method of claim 8 in which the user is taken directly to a conventional landing page with sponsored links when the user inputs inadvertently the polling web site domain name.

10. The method of claim 8 in which the user is taken directly to an intermediary page which itself includes a link to the full polling page.

11. The method of claim 10 in which the link on the intermediary page relates to a polling question such that a user who answers the polling question is then taken to the polling web site.

12. The method of claim 1 in which the typing or address input error relates to the body of the domain name, i.e. a part of the domain name excluding the TLD.

13. The method of claim 1 comprising the further step of recruiting a polling panel member.

14. The method of claim 13 when used for real time instant polling.

15. The method of claim 13 when used for future polling.

16. The method of claim 1 when used for real time instant polling.

17. The method of claim 1 comprising the further step of segregating members of the representative sample by location by using the IP address of each user in the sample.

18. The method of claim 1 comprising the further step of providing to the user instant feedback of current polling results.

19. The method of claim 1 comprising the further step of predicting political or economic events based on the results of polling.

20. The method of claim 1 comprising the further step of assessing website popularity.

21. A web site hosted on a server, the web site enabling a representative online polling sample to be obtained, the web site including polling information for a user to select or otherwise interact with, that polling web site having a domain name that differs from the domain name of a web site the user intends to reach, the polling web site being reached when the user makes a typing or other address input error and inadvertently enters the polling web site domain name.

* * * * *